United States Patent [19]
Cottell

[11] 4,412,512
[45] Nov. 1, 1983

[54] FUEL SUPPLY SYSTEM

[76] Inventor: Eric C. Cottell, Private Rd., Bayville, N.Y. 11709

[21] Appl. No.: 199,782

[22] Filed: Oct. 23, 1980

Related U.S. Application Data

[63] Continuation of Ser. No. 2,626, Jan. 11, 1979, abandoned, which is a continuation of Ser. No. 968,316, Dec. 11, 1978, abandoned.

[51] Int. Cl.³ .............................................. F02M 25/02
[52] U.S. Cl. .............................. 123/25 E; 123/25 R; 123/25 D; 123/25 C
[58] Field of Search ................ 123/25 C, 25 D, 25 E, 123/25 R, 25 B

[56] References Cited

U.S. PATENT DOCUMENTS

| | | | |
|---|---|---|---|
| 1,611,429 | 12/1926 | Fish | 123/25 E |
| 2,319,858 | 5/1943 | Grow | 123/25 E |
| 2,671,311 | 3/1954 | Rohrbach | 123/25 R |
| 2,810,561 | 10/1957 | Rosenthal | 123/25 E |
| 3,921,599 | 11/1975 | Grow | 123/25 E |
| 3,953,002 | 4/1976 | England et al. | 259/4 AB |

FOREIGN PATENT DOCUMENTS

| | | |
|---|---|---|
| 1632405 | 8/1970 | Fed. Rep. of Germany . |
| 2757419 | 7/1978 | Fed. Rep. of Germany . |
| 409333 | 4/1934 | United Kingdom . |

*Primary Examiner*—Ira S. Lazarus

[57] ABSTRACT

A fuel supply system is disclosed in which oil and water are mixed and delivered under pressure to a nozzle or other atomizing means at which combustion is to occur. The mixture of oil and water is delivered to the atomizing means along conduit means and those conduit means include means to produce agitation of the oil and water so that an intimate mixture of oil and water is delivered to the atomizing means. Complete emulsification occurs at the atomizing means to promote combustion.

9 Claims, 6 Drawing Figures

FUEL SUPPLY SYSTEM

This is a continuation of application Ser. No. 002,626 filed Jan 11, 1979, now abandoned, which is a continuation of Ser. No. 968,316 filed Dec. 11, 1978, now abandoned.

BACKGROUND OF THE INVENTION

This invention is concerned with a fuel supply system, particularly although not exclusively, since it will be apparent to those skilled in the art that the invention is applicable also in such environments as heating systems, the invention is concerned with a fuel supply system for a diesel engine. The invention is also applicable to fuel injected gasoline engines, to turbine engines and possibly to conventional gasoline engines provided with a carburetor.

It is known that the inclusion of water particles trapped inside fuel oils will promote combustion and that in a diesel engine, NOX and particulate emissions are reduced and power is increased. Attempts have been made to create an emulsion ahead of the injector pump by the utilization of an ultrasonic reactor to which a mixture of oil and water is delivered. However, particularly in small, high speed diesels the emulsions have proven to have a very short life and it is questionable whether the emulsion would remain stable even long enough to permit it to enter the combustion zone. In these attempts it has been recognized that it is necessary that the water phase of the emulsion be finely divided at the point of combustion if effective burning is to be achieved. This fact holds true in any environment in which a mixture of oil and water is to be burned.

BRIEF SUMMARY OF THE INVENTION

According to this invention, in a system in which a pump, such as the injection pump in the fuel system of a diesel engine, delivers fuel to a nozzle or other atomizing means advantage is taken of the emulsifying effect of the pump and nozzle by agitating fuel and water in the conduits leading to the pump and/or nozzle to such an extent that an intimate, finely divided mixture of oil and water is delivered to that nozzle. In this way a fine water and oil emulsion is issued from the nozzle.

The means for causing agitation of the fuel and water may be disposed either in the conduit along which the oil and water is delivered to the injection pump or in the conduit along which the oil and water is delivered from the pump to the nozzle. Also, of course, the agitating means may be disposed in both of these locations.

The means for causing the agitation may comprise a baffle like element disposed in the conduits and so devised as to constantly divide the mixture of fuel and water and reunite it. Most desirably a swirling action of the constituents of the fuel is achieved and this can be obtained by having the baffle means of a helical form. Alternatively rifling may be formed in the conduits to impart a swirling motion or a helical spring type device could be disposed in the conduits. It is possible, depending on the pressures of the constuents of the fuel within the conduits and, of course, the bores of those conduits, that the frictional inter-action of the fuel with the walls of the conduit could produce a sufficient agitation.

The supply of water to the conduits may be established by the utilization of a float chamber and an appropriate orifice. Valve means may be provided for varying the mixture. The water may be carried in a separate tank or, particularly where the invention is applied to a motor vehicle, it may be condensed from the exhaust of the vehicle. In this latter instance the condenser can serve also as a scrubber to remove particulate emissions from the exhaust and of course, the recirculation of the products of combustion additionally tends to clean the exhaust.

DESCRIPTION OF THE PREFERRED EMBODIMENTS

Figure 1:
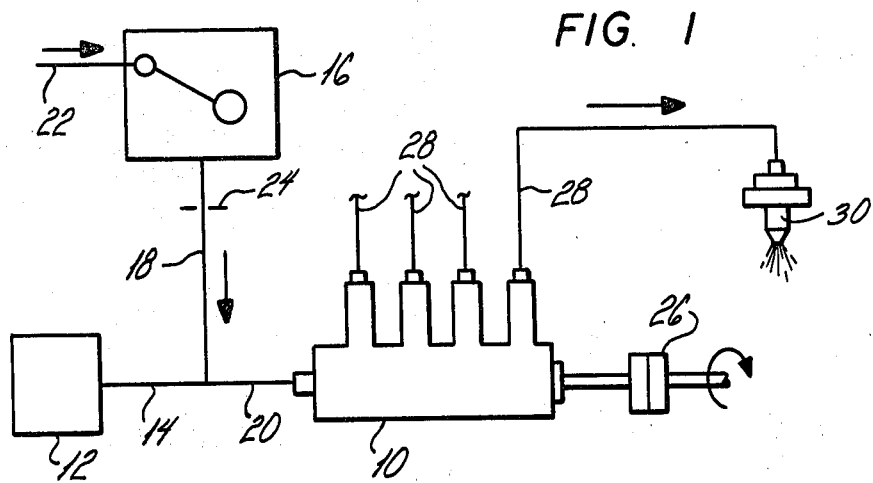
FIG. 1 is a schematic illustration of a system according to the present invention.

In FIG. 1 there is schematically illustrated a system according to the present invention utilized with a diesel engine. In that system an injection pump is indicated at 10 which receives oil from a supply 12 along conduit 14 and water from a supply 16 which is delivered along conduit 18 to be united with the fuel in conduit section 20. The supply 16 comprises a float chamber maintained filled along a water supply line 22, the float chamber being connected to conduit 18. Included in conduit 18 is an orifice or other restriction indicated at 24. Conduit 18 is most desirably of very narrow bore so that water is injected into the fuel passing along conduit 14 in the form of regularly spaced spheres.

Figure 2:
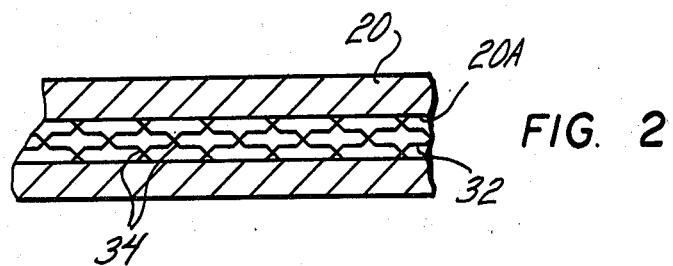
FIGS. 2, 3 and 4 show details of the embodiment of FIG. 1.
Figure 3:
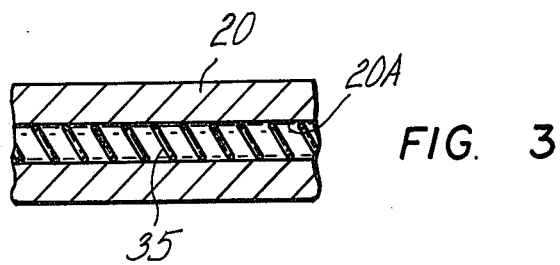
Figure 4:
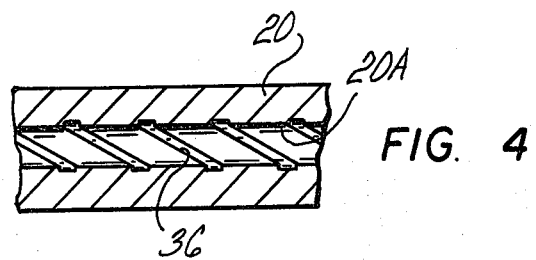

As is conventional the injection pump 10 is driven from the diesel engine by a coupling 26. The injection pump delivers along conduits 28 to individual nozzles 30, only one of which is illustrated for the purposes of clarity, of the cylinders of the engine. At least one of the conduit section 20 and conduit 28 includes means for causing agitation of the oil and water passing therealong. Typical means for causing agitation are illustrated in FIGS. 2, 3 and 4 and are described more fully hereinafter. To utilize the turbulent conditions prevailing at the inlet of the pump to achieve mixture of the oil and water, it may be desirable to have the injection of the water into the oil occur at that inlet in which case section 20 of the conduit would be very short.

It is to be recognized that if a mixture of oil and water is delivered to a nozzle under pressure there will be an emulsification effect at the nozzle. By the inclusion of the agitation means described hereabove in the conduits through which the oil and water is passed to the nozzle repeated rapid division and re-mixing of the material flowing down the conduits is achieved so that there is delivered to the nozzle a finely divided, intimate mixture of oil and water.

FIG. 2 illustrates one means according to the invention producing agitation within the conduits of the supply system. The conduit is indicated at 20 and within its bore 28 there is disposed a wire like element 32 which at intervals along its length has propeller-like sections 34, the individual blades of those propeller-like sections being inclined to produce a swirling action of material passing thereover. Adjacent ones of the propellers are angularly offset from one another or may be of opposite hand so that as the mixture of oil and water flows through the conduit it is constantly deflected and reconstituted so that a fine intimate mixture of oil and water will result.

FIG. 3 shows an alternative form of achieving a swirling action and in that embodiment, within bore 28 there is disposed a helical spring 34. It will be recognized that as the mixture passes along the conduit it will be forced to swirl. This will produce an intimate mixture of the two components of the fuel.

An alternative embodiment is illustrated in FIG. 4 in which the surface defining bore 28 is formed with rifling grooves 36 which have an effect similar to that of the spring 34 in the embodiment of FIG. 3.

Figure 5:
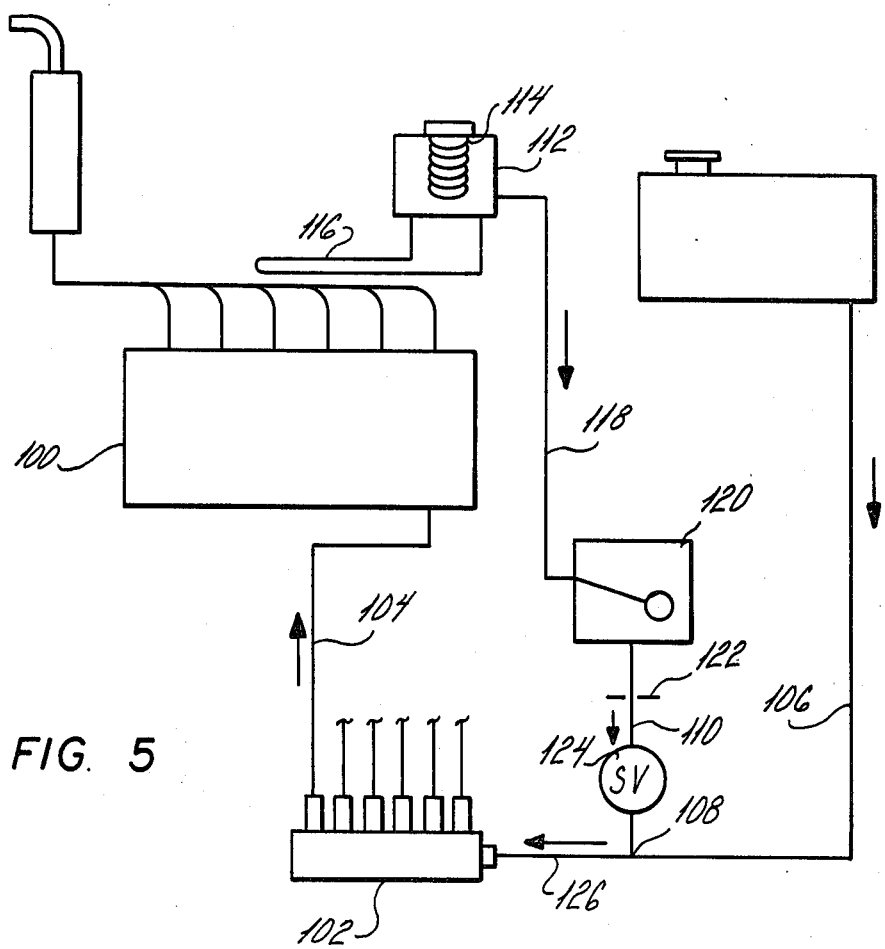
FIG. 5 shows a different form of fuel system according to the present invention.

An alternative arrangement is illustrated in FIG. 5. In that embodiment an engine 100 is supplied by an injection pump 102 along fuel supply conduit 104. Oil is delivered to the injection pump 102 from an oil supply along conduit 106. Water is delivered to a T junction 108 with the conduit 106, along conduit 110. The water is delivered from a reservoir 112 which may include an immersion heating coil 114 or, which may have a heat exchanging relationship with the exhaust manifold of engine 100 as indicated schematically at 116. By heating the water, freezing problems are avoided.

From supply 112 a conduit 118 leads to a float chamber 120 which, as aforementioned, via conduit 110, leads the water to be united with the oil in conduit 106. In conduit 110 there is provided an orifice 122 and a solenoid controlled valve 124. From the T junction 108 a mixture of oil and water is delivered along conduit section 126 to injection pump 102. The conduit section 106 and conduit 104 include means for causing agitation of the oil and water flowing there along those means being effective to produce a finely divided intimate mixture of oil and water at the injection nozzles of the engine 100.

It will be apparent that by the relatively even distribution of water in oil produced by injecting the water in a controlled fashion into the fuel in conduits 106, 141, and by the restrictions and/or agitation means in conduits 20, 28, 126, 104, and by the turbulent conditions in the pump itself, the nozzle or nozzles will see an intimate, finely divided mixture which permits the nozzle to effect the final emulsification thus eliminating the problem of separation of the emulsion before reaching the combustion zone.

Figure 6:
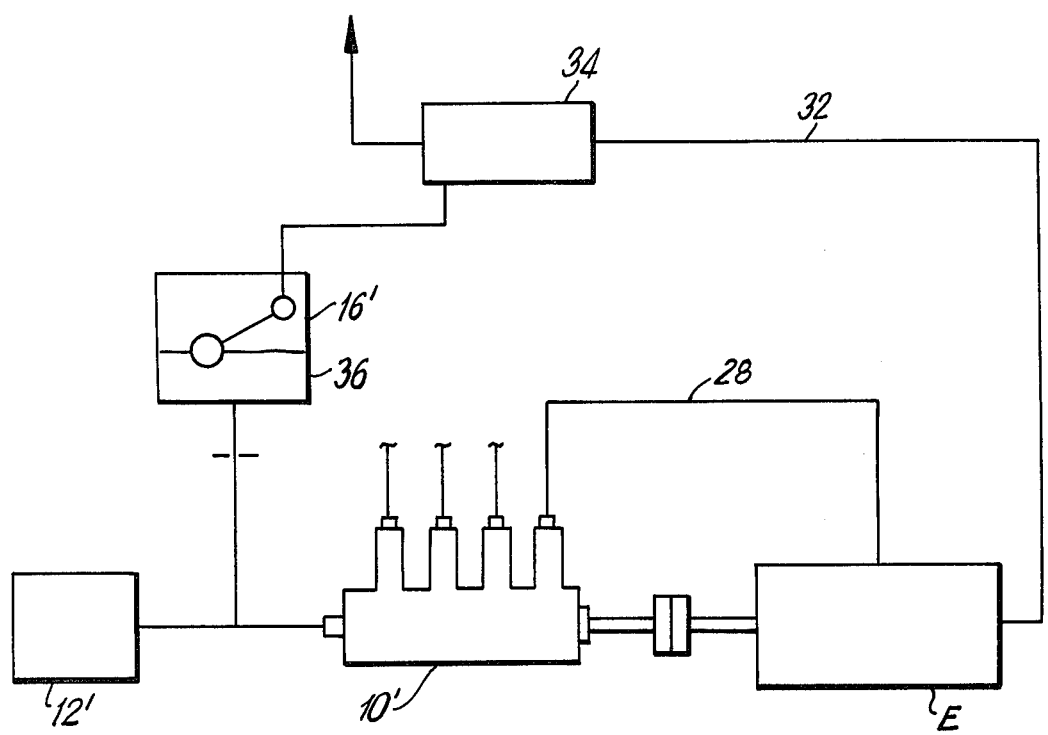
FIG. 6 shows a further form of fuel system according to the invention.

The embodiment of the invention illustrated in FIG. 6 largely resembles that in FIG. 1, having an injection pump 10', a fuel tank 12' and a water supply 16'. Fuel comprising a mixture of oil and water is delivered to injection nozzles of engine E along lines 28 and the products of combustion leave the engine to exhaust system 32. The exhaust system includes a condenser 34 which may take any convenient form effective to condense a sufficient quantity of water from the exhaust to provide a supply for use in the fuel system. From the condenser water is delivered to float chamber 36 to be used in the fuel supply. Such an arrangement has certain very distinct advantages. As well as eliminating the need to carry a water supply tank, the condenser tends to remove dangerous particulate emissions from the exhaust of the engine by acting as a scrubber and, of course, the recirculation of the condensed portions of the exhaust to the engine also improves the emissions level. To improve the scrubbing effect of the condenser it is possible to use a spray type unit, the water of the spray being derived from the exhaust.

It will be readily appreciated that the invention here described is subject to various modifications not deviating from its scope. Additionally, while the invention has been described with particular reference to its application in diesel engines it will readily be appreciated that it is equally applicable to any system in which oil or other liquid fuel and water are to be burned as, for example, in household oil burning systems, gasoline engines and turbine engines.

What is claimed is:

1. A fuel supply system comprising a pump and nozzle means, a source of fuel, a source of water, first conduit means through which a mixture of fuel and water is delivered to said pump, means establishing liquid flow communication from said fuel source and water source to said first conduit means at at least one location spaced from said pump, second conduit means through which the fuel and water mixture is delivered from said pump to said nozzle means, and means disposed within said second conduit means for agitating said fuel and water flowing within said second conduit means from said pump to said nozzle whereby an intimate mixture of fuel and water is delivered to said nozzle where final emulsification takes place, said means for agitating said fuel and water in said second conduit means, said pump and said nozzle constituting means for emulsifying the fuel and water, said pump comprising pressure means for supplying pressure in said first and second conduit means and through said agitating means.

2. The system as claimed in claim 1 further comprising means disposed within said first conduit for agitating said fuel and water flowing within said first conduit upstream of said pump, whereby an intimate mixture of fuel and water is delivered to said pump.

3. A system as claimed in claim 1 wherein said means for causing agitation comprise baffle means disposed within said conduit means.

4. A system as claimed in claim 3 wherein said baffle means are static.

5. A system as claimed in claim 4 wherein said baffle means are effective to produce a swirling motion of said fuel and water.

6. A system as claimed in claim 5 wherein said baffle means comprises an insert disposed in said conduit means and including a plurality of blade like projections.

7. A system as claimed in claim 5 wherein said baffle means comprises a helical spring disposed within said conduit means.

8. A system as claimed in claim 5 wherein said baffle means comprises rifling grooves formed in the interior surface of said conduit means.

9. The fuel system of claim 1 further comprising condenser means for condensing water from the products of burning said fuel and water emulsion to be mixed with said fuel in the first conduit upstream of said pump.

* * * * *